Nov. 9, 1948.      I. J. WILLIAMS      2,453,392
ONE-HAND FRUIT PICKING DEVICE
Filed Oct. 4, 1946
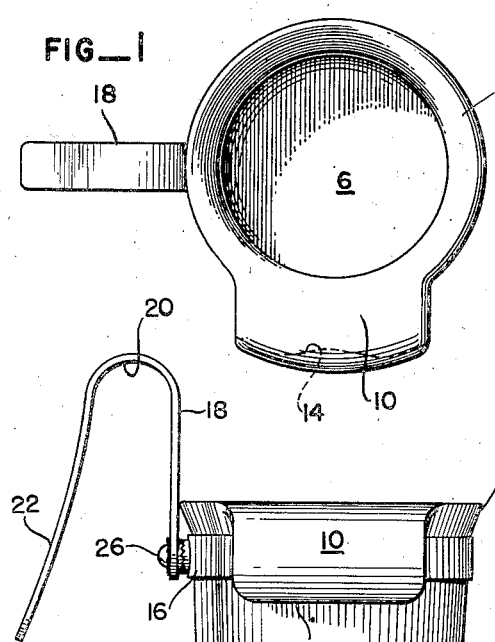
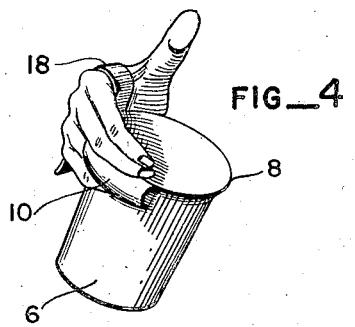
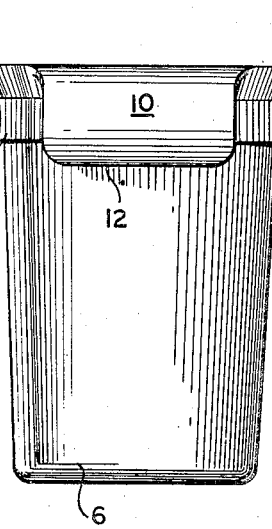
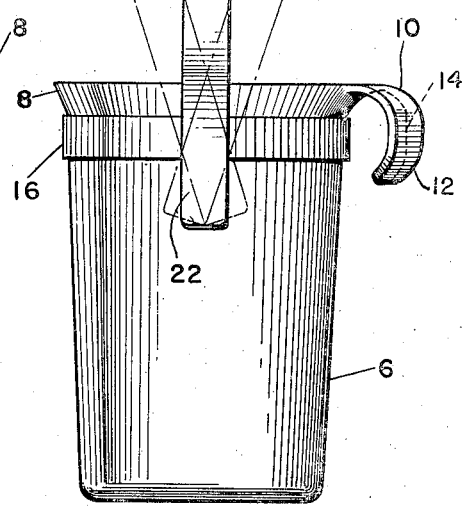
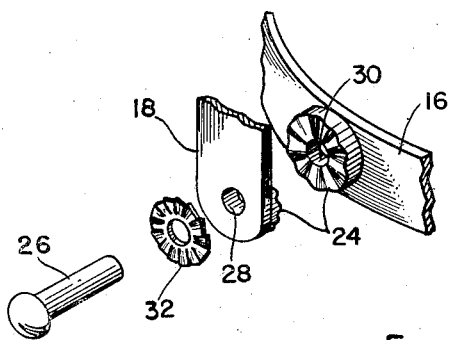
IRVIN J. WILLIAMS
INVENTOR.
BY Smith & Tuck
ATTORNEYS Patented Nov. 9, 1948

2,453,392

UNITED STATES PATENT OFFICE 2,453,392

ONE-HAND FRUIT PICKING DEVICE

Irvin J. Williams, Seattle, Wash.

Application October 4, 1946, Serial No. 701,109

4 Claims. (Cl. 224—28)

My present invention relates to that general class of devices employed as aids in the picking of fruit and, more particularly, to an arrangement making possible a one-hand fruit picking device.

In the picking of various fruits, particularly the crushable berries, there has long been a need for a device that would permit an individual to use one or both hands and to store a reasonable amount of fruit in the hands during the picking operation before depositing them in the berry box or container. Normally, when the berries are thus held in the palm of the hand while additional fruit is picked, there is quite a tendency to crush the berries and to render them less attractive in appearance and, consequently, less saleable. In my present arrangement, I have endeavored to overcome the disadvantages of those devices observed, and to provide one that is characterized by general utility and simplicity of construction.

The principal object of my invention is to provide a berry picker that may be held in one hand while the thumb and two first fingers of the same hand pick berries and deposit them in the container of my device.

A further object of my invention is to provide a cup-like device with a handle that is adjustable, so that the device may be used in the right or left hand, and further so that the angle made by the handle with the container may be adjusted for the greatest convenience of the user.

A further object of my invention is to provide a replaceable container or vessel which will fit into a band or ring, which ring in turn has the supporting handle adjustably secured to it.

A further object of my invention is to provide a container for use with my device that will be lipped, so that it may be engaged between the extended fingers and which may be reversed in its position by merely turning the same so that it may be used for either hand.

Further objects, advantages and capabilities of my device will be apparent, it is believed, from the description and the disclosures in the accompanying drawings, or are comprehendable or are inherent in the device.

In the drawings:

Fig. 1 is a top plan view of my device;

Fig. 2 is a side elevation of the same, taken from a point of view showing the finger-engaging lip of said cup;

Fig. 3 is a view, in elevation, revolved ninety degrees from Fig. 2;

Fig. 4 is a perspective view of my device as worn on a berry picker's hand; and

Fig. 5 is an exploded, perspective view, showing the various elements making up my handle-adjusting and securing means.

Referring more particularly to the disclosure in the drawings, my novel fruit picking device is provided with a container or vessel 6, which is shaped somewhat like a water glass, preferably with a tapering wall which at its upper end is provided with an outwardly extending rim or bead 8. One portion of the periphery of bead 8 is extended outwardly to form the finger-engaging lip 10. This lip is provided with an outward, downward and inward curve, probably best illustrated in Fig. 3 at 12, and in order to provide for greater security of holding and more accurate positioning of the finger that normally engages the lip, I have provided that the interior be formed as shown by the dotted line at 14 of Fig. 1. This provides a two-part taper with the apex at the center of the lip, so that a finger may be inserted from either side and come to a snug bearing in the ring portion of the lip. It has been found very desirable to have vessel 6 very definitely and accurately secured in position relative to the hand, and at the same time the device must be comfortable and convenient to wear. It has therefore been found that by tapering the inside bore 14 of the ring 12 this can most readily be achieved.

Container 6 is supported in its operating position by an encircling band 16 which fits the container snugly, but still permits the same to be removed from the band, and the container is held against slipping through the relatively loose band by the outwardly flared top portion 8. The preferred arrangement is to have the side wall of container 6 somewhat tapered so that engagement will be secure, and yet allow the container to be turned within band 16 so as to adapt it for use in either the right or left hand, and also to assist in properly fitting it into a comfortable position in whichever hand is to be used.

Secured to band 16 is an upwardly extending handle 18. This handle is substantially U-shaped, as illustrated in Fig. 2, and extends upwardly a sufficient distance so that the bight portion 20 will be at such a distance above the upper margin of the container that the lip 10 can be passed between the second and third fingers, substantially as illustrated in Fig. 4. The handle is provided with the outstanding portion 22 which is spaced away from the other leg of the U a sufficient distance to give slight spring tension on the palm of the hand when the device is in use. Further, it has been found desirable to have leg 22 extend somewhat below the point of attachment on band 16 and to be outwardly flared. This makes for greatest convenience in use and adaptability to very easy and ready adjustment.

Handle 18 is secured to band 16 preferably by the arrangement more fully illustrated in Fig. 5. Two mating radially toothed jaw clutch members 24 are employed, one secured to band 16 and the other secured to handle 18. A pin, bolt, or rivet 26 is employed passing through openings 28 and 30, and including the spring member 32, so that when fully assembled the spring washer will provide sufficient resilience so that, by grasping the container or band 16 and the handle 18, the two can be moved angularly with respect to each other, and then when released, the spring washer 32 will hold the vessel and the handle in that preferred angular relationship.

In Fig. 3 I have illustrated the handle as being vertically disposed with respect to band 16. This would be a rare condition of use. Normally, it would assume substantially one or the other of the dashed line positions illustrated in Fig. 3, depending on whether the right or left hand were used for the picking operation.

Method of use

In using my berry-picking device, let us assume that the right hand is to be used, as illustrated in Fig. 4. Handle 18 is slipped over the palm of the hand until the bight portion 20 is in snug engagement with the index finger portion of the palm. Then, by grasping the container, while the hand that is now encircled by the handle, holds the same, the proper angular relationship is arrived at which is most convenient to the particular operator who is going to use the device. When this adjustment is completed, spring 32 holds the handle in this offset relationship. It has been found, however, that a mere band handle is not sufficient to hold the container unless it gets additional support from the fingers, and in picking berries and the like, it has been found desirable to have the index and second fingers and the thumb as a cooperative group. Consequently, it has been found very desirable to next revolve container 6 in band 16 until the position substantially as shown in Fig. 4 is achieved, wherein the third finger is partially encircled by band 12. The device can now be held definitely in position by the band-like handle 18 and the ring 12 leaving the required fingers and thumb free for the picking of fruit. All that is necessary is to pull the fruit from its stem and release it and it will drop into the cup which is periodically emptied as it becomes filled.

It is believed apparent from the above description and the disclosure in the drawings that the invention comprehends a novel construction of a fruit picking device.

Having thus disclosed the invention, I claim:

1. A fruit-picking device consisting of a cup-like vessel, an outstanding lip formed as part of said vessel and curved downwardly to partially encircle the finger of a user; a handle for said vessel having a palm receiving bight portion extending upwardly above the rim of the vessel sufficiently to permit the said outstanding lip to be engaged between the extended fingers of a user; a band encircling said vessel; and means for securing said handle in adjusted angular relationship to said band.

2. A fruit-picking device consisting of a cup-like vessel; an outstanding lip formed as part of said vessel and curved outwardly and downwardly to form a finger receiving bore; a handle for said vessel having a palm receiving bight portion extending upwardly above the rim of the vessel sufficiently to permit the said outstanding lip to be engaged between the extended fingers of a user; and means for securing said handle in adjusted angular relationship to said vessel.

3. A fruit-picking device consisting of a cup-like vessel having an outstanding lip adapted to pass between the extended fingers of a fruit picker's hand, and partially encircle the finger on which it rests; a handle for said vessel, said handle having a palm receiving bight portion extending upwardly above the rim of the vessel sufficiently to permit the said outstanding lip to be engaged between the extended fingers; a band encircling said vessel near its top; and adjustable means for securing said handle to said band.

4. A fruit-picking device consisting of a cup-like fruit receiving vessel; an outstanding lip secured to said vessel adapted to pass between the extended fingers of a fruit picker's hand, said lip extending outwardly and downwardly and adapted to partially encircle the finger on which it rests; an inner surface for said lip forming a double taper extending and increasing the bore each way from the mid-point of the bore; a handle for said vessel, said handle having a palm receiving bight portion extending upwardly above the rim of the vessel sufficiently to permit the said outstanding lip to be engaged between the extended fingers of a user, a band encircling said vessel near its top, and adjustable means for securing said handle to said band.

IRVIN J. WILLIAMS.

REFERENCES CITED

The following references are of record in the file of this patent:

UNITED STATES PATENTS

| Number | Name | Date |
|---|---|---|
| 1,184,628 | Crowner | May 23, 1916 |
| 1,236,929 | Hauck | Aug. 14, 1917 |
| 1,505,396 | Lees | Aug. 19, 1924 |
| 1,530,256 | Garland | Mar. 17, 1925 |
| 1,583,041 | Herrick | May 4, 1926 |
| 2,202,365 | Zeman | May 28, 1940 |